(12) United States Patent
Birch

(10) Patent No.: US 9,785,964 B2
(45) Date of Patent: Oct. 10, 2017

(54) MICRO DIGITAL SIGNAGE HARDWARE INTEGRATION

(75) Inventor: Thomas Birch, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 802 days.

(21) Appl. No.: 13/997,077

(22) PCT Filed: Dec. 14, 2011

(86) PCT No.: PCT/US2011/064928
§ 371 (c)(1),
(2), (4) Date: Sep. 18, 2013

(87) PCT Pub. No.: WO2013/089705
PCT Pub. Date: Jun. 20, 2013

(65) Prior Publication Data
US 2014/0012641 A1 Jan. 9, 2014

(51) Int. Cl.
*G06Q 30/02* (2012.01)
*G09F 9/30* (2006.01)
*G09F 3/20* (2006.01)

(52) U.S. Cl.
CPC ......... *G06Q 30/0241* (2013.01); *G09F 3/204* (2013.01); *G09F 9/30* (2013.01)

(58) Field of Classification Search
CPC .... G06Q 30/0241; G06Q 30/02; G09F 3/204; G09F 9/30; G06F 3/147; G09G 2380/04
USPC ......... 705/26.1, 27.1, 14.4; 348/840, E5.128
See application file for complete search history.

(56) References Cited

U.S. PATENT DOCUMENTS

| | | | | |
|---|---|---|---|---|
| 4,488,653 A | * | 12/1984 | Belokin | A47F 5/005 108/61 |
| 5,461,561 A | | 10/1995 | Ackerman et al. | |
| 5,752,917 A | * | 5/1998 | Fuchs | A61B 5/0022 600/484 |
| 6,202,568 B1 | * | 3/2001 | Kochanski | A47B 21/0314 108/50.01 |

(Continued)

FOREIGN PATENT DOCUMENTS

| CN | 1774733 A | 5/2006 |
|---|---|---|
| CN | 1989523 A | 6/2007 |

(Continued)

OTHER PUBLICATIONS

Chinese Office Action, Application No. 201180075482.1, Aug. 28, 2015, 14 pages total including 9 pages of English translation.

(Continued)

*Primary Examiner* — Yogesh C Garg
(74) *Attorney, Agent, or Firm* — Jordan IP Law, LLC

(57) ABSTRACT

A system to display information using a display shelf of a retailer may include a first display configured to be attached to a first edge portion of the display shelf and to display information related to a first product. A second display may be configured to be attached to a second edge portion of the display shelf and to display information related to a second product. The first display and the second display can be configured to have a height similar to a height of the first and the second edge portion of the shelf. The first display and the second display may also be configured to display information related to a third product as if the first display is continuously connected to the second display as an extended display.

14 Claims, 8 Drawing Sheets

(56) References Cited

U.S. PATENT DOCUMENTS

| | | | |
|---|---|---|---|
| 6,209,831 | B1 | 4/2001 | Kiplinger et al. |
| 6,897,816 | B2 * | 5/2005 | Wang .................. G01K 1/02 |
| | | | 343/702 |
| 2004/0165198 | A1 * | 8/2004 | Fischer ................ G01B 21/08 |
| | | | 356/630 |
| 2007/0271143 | A1 * | 11/2007 | Dooley ................ G06Q 20/20 |
| | | | 705/14.1 |
| 2009/0109130 | A1 | 4/2009 | Murphy et al. |
| 2010/0044326 | A1 | 2/2010 | Meyer-Hanover et al. |
| 2012/0120327 | A1 * | 5/2012 | Marx ...................... G06F 3/147 |
| | | | 348/840 |

FOREIGN PATENT DOCUMENTS

| | | |
|---|---|---|
| CN | 101522076 A | 9/2009 |
| CN | 201899202 U | 7/2011 |
| CN | 102165446 A | 8/2011 |
| DE | 3700765 A1 | 7/1988 |
| DE | 4034154 A1 | 5/1991 |
| DE | 4416360 A1 | 11/1995 |
| DE | 69518694 T2 | 5/2001 |
| DE | 602004008225 T2 | 5/2008 |
| WO | 2007146821 A2 | 12/2007 |
| WO | 2010027775 A2 | 3/2010 |
| WO | 2013/089705 A1 | 6/2013 |

OTHER PUBLICATIONS

Chinese Office Action, Application No. 201180075482.1, May 16, 2016, 21 pages total including 13 pages of English translation.
International Preliminary Report on Patentability and Written Opinion received for PCT Patent Application No. PCT/US2011/064928, mailed on Jun. 26, 2014, 6 pages.
Office Action for Chinese Patent Application No. 201180075482.1, mailed Dec. 8, 2016, 19 pages including 12 pages of English translation.
International Search Report and Written Opinion received for PCT application No. PCT/US2011/064928, dated Apr. 19, 2012, 9 pages.
Notice of Allowance for Chinese Patent Application No. 201180075482.1, dated May 31, 2017, 6 pages including 2 pages of English translation.

* cited by examiner

MICRO DIGITAL SIGNAGE HARDWARE INTEGRATION

BACKGROUND

Technical Field

Embodiments of the present invention generally relate to the field of data processing, and in some embodiments, specifically relate to displaying data on a digital signage.

Discussion

Price tags in grocery stores may be typically plastic or paper with adhesive. Managing these tags can be time consuming, error prone and expensive. Currently, the pricing of products might be a manual process. A typical grocery store might have over 25,000 SKUs on which to manage pricing. Most stores employ one to two full time employees just to manage the pricing displays on a daily basis. Performing production selection can be a time consuming in-person direct observation activity.

BRIEF DESCRIPTION OF THE DRAWINGS

The multiple drawings refer to the embodiments of the invention. While embodiments of the invention described herein is subject to various modifications and alternative forms, specific embodiments thereof have been shown by way of example in the drawings and will herein be described in detail.

FIG. 1A a diagram that illustrates a front left perspective view example of a micro digital signage (MDS) unit, in accordance with some embodiments;

DETAILED DESCRIPTION

Figure 1B:
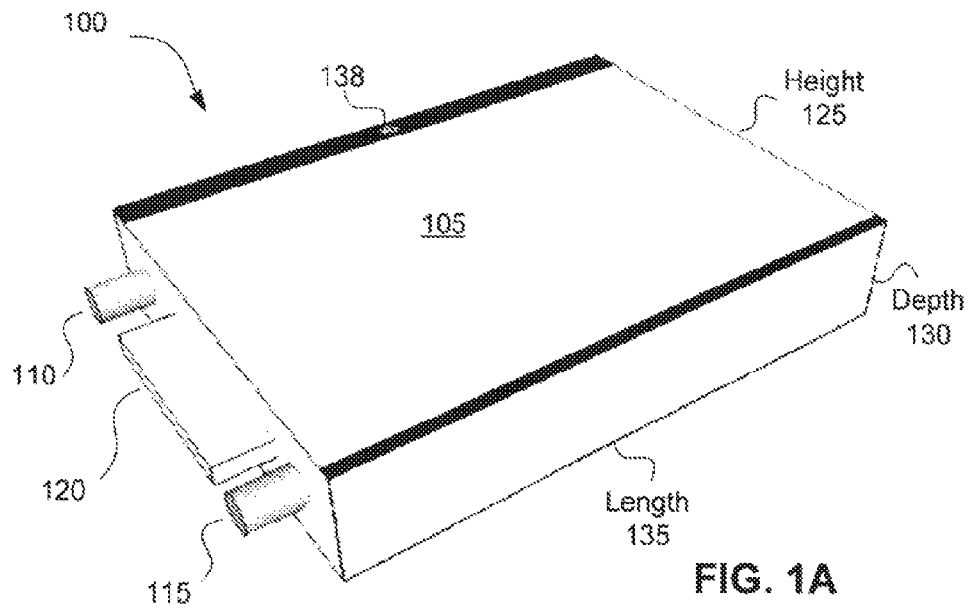
FIG. 1B illustrates a front left perspective view example of a section of a shelf that may be used to attach to a MDS unit, in accordance with some embodiments.

For some embodiments, methods and apparatuses of enabling displaying merchandise related information to consumers using digital signage units are disclosed. The merchandise related information may be associated with retailers, advertisers, brand managers or any entities that desire to present the merchandise related information to the consumers using one or more signage units installed at positions where the merchandises may be physically displayed. The digital signage unit may be configured to operate independently or together with other digital signage units. The digital signage unit may include at least a processor, a communication module and a display. In addition, the digital signage unit may communicate with a server computing system to receive the merchandise related information which may include pricing information and advertising information.

In the following description, numerous specific details are set forth, such as examples of specific data signals, components, connections, etc. in order to provide a thorough understanding of the various embodiments of the present invention. It will be apparent, however, to one skilled in the art that the embodiments of the present invention may be practiced without these specific details. In other instances, well known components or methods have not been described in detail but rather in block diagrams in order to avoid unnecessarily obscuring the embodiments of the present invention. Reference may be made to the accompanying drawings that form a part hereof, and in which it is shown by way of illustration specific embodiments in which the invention can be practiced. It is to be understood that other embodiments can be used and structural changes can be made without departing from the scope of the embodiments of this invention. As used herein, the terms "couple," "connect," and "attach" are interchangeable and include various forms of connecting one part to another either directly or indirectly. Also, it should be appreciated that one or more structural features described in one embodiment could be implemented in a different embodiment, even if not specifically mentioned as being a feature thereof. Thus, the specific details set forth are merely exemplary. The specific details may be varied from and still be contemplated to be within the spirit and scope of embodiments of the present invention.

Described herein are embodiments of a micro digital signage (MDS) unit configured to primarily deliver information to consumers in areas where merchandises may be displayed. One example of such an area is a retailer's store. The retailers can benefit from using the MDS units to improve customer service, improve pricing and coupon delivery and enhance a store's overall ambiance. The consumers may benefit by receiving informative information (e.g., nutrition, discounts, recipe, etc.) delivered by the MDS unit non-intrusively via a display associated with the MDS unit. The MDS unit can therefore enhance the consumer's shopping experience while promoting specials and products and enabling pricing strategies for the retailers. Further, the MDS unit may be configured to enable video analytics, shelf disarray notification, traffic pattern analysis, store heat maps of consumer dwell time, and other applications that are not possible with the static paper pricing tags as used today.

Figure 1C:
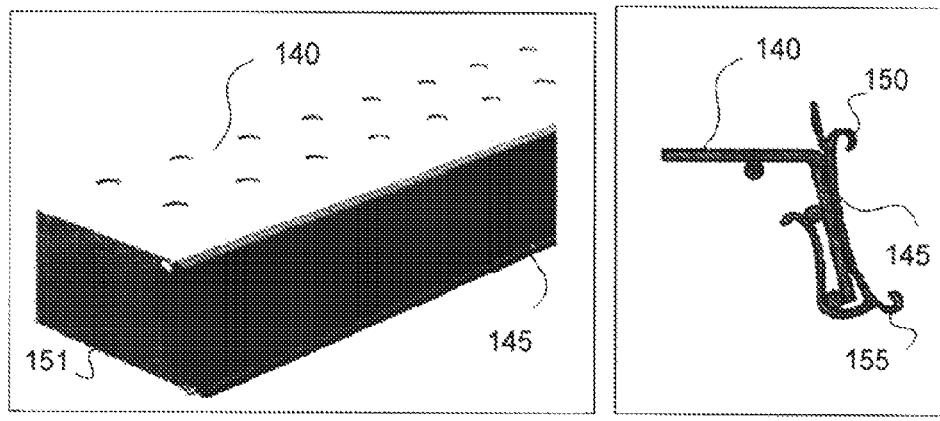
FIG. 1C illustrates an example cross-section of the shelf shown in FIG. 1B.

Turning now to FIGS. 1A-1C, FIG. 1A is a diagram that illustrates a front left view example of a micro digital signage unit, in accordance with some embodiments. Diagram 100 includes a micro digital signage (MDS) unit having height 125, depth 130 and length 135. For some embodiments, the MDS unit is configured to fit on a display shelf typically seen in a retail shop such as, for example, a supermarket. The digital signage unit may be located at a shelf edge where the paper price tags are typically used to display the price information. The MDS unit may be configured to provide the merchandise-related information about the products that are displayed on the shelves where the MDS unit is positioned. For example, the merchandise-related information may include price, coupons, advertising, specials, manufacturer-provided information, social network information relative to the merchandise (e.g., like, reviews, etc.), merchandise-related games, etc.

The MDS unit may include camera module 138, a display 105, male pins 110 and 115 and interface connector 120. The camera module 138 may be used to collect video analytics. The display 105 may be a touch-sensitive display and may be configured to display information independently or together with neighboring displays in a border-less configuration. The display 105 may be a color display. Using the touch-sensitive display 105, a consumer may interact with the information being displayed. For example, the consumer may cause nutritional facts associated with a food merchandise to be displayed, or the consumer may play merchandise-related games. Power and data may be transferred among a plurality of the MDS units through the interface connector 120. The male pins 110 and 115 may also be used to transfer low voltage power. The MDS unit may have a small form factor with, for example, the height 125 at approximately 2 inches, the depth 130 at approximately ⅜ inch, and the length 135 at approximately 6 inches.

FIG. 1B illustrates a front left view example of a section of a shelf that may be used to attach to a MDS unit, in accordance with some embodiments. The shelf includes a shelf top 140, a front edge 145, and a side edge 151. Merchandises are typically placed on the shelf top 140, and price information is typically displayed on the front edge 145. The front edge 145 is considered to be an edge that is most visible to a consumer. The front edge 145 is typically the edge that the consumer uses to took for price information. For some embodiments, the height of the display 105 (shown in FIG. 1A) is configured to be approximately the size of the front edge 145. This may be advantageous because it enables the MDS unit to be attached to many existing shelves without requiring the retailers to replace the existing shelves to accommodate the MDS unit. It may be possible that various products may be placed on the shelf top 140, and the display 105 may display information related to at least one of those products.

FIG. 1C illustrates an example cross-section of the shelf. The cross-section view illustrates top and bottom retaining portions 150 and 155 which are designed to keep a paper price tag in place. As will be described, for some embodiments, the retaining portions 150 and 155 may be used with a retaining mechanism to keep the MDS unit in place.

Figure 2A:
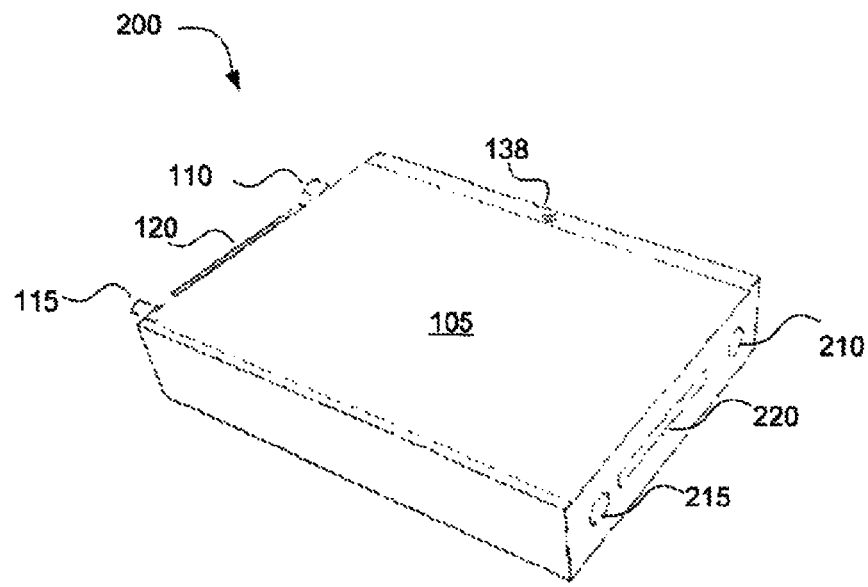
FIG. 2A is a diagram that illustrates a front right perspective view example of a MDS unit, in accordance with some embodiments.

FIG. 2A is a diagram that illustrates a front right view example of a MDS unit, in accordance with some embodiments. Diagram 200 includes a MDS unit similar to the MDS unit illustrated in FIG. 1. The MDS unit may include interface pin receptacles 210 and 215 and connector receptacle 220 on its right side. The interface pin receptacles 210 and 215 and connector receptacle 220 may enable the MDS unit to interconnect to a neighboring MDS unit to its right. The male pins 110 and 115 and the interface connector 120 may enable the MDS unit to interconnect to a neighboring MDS unit to its left. This enables interconnecting the plurality of MDS units. It may be noted that the number of male pins 110 and 115 and the number of receptacles 210 and 215 may vary depending on the implementations. For example, only one male pin and one female receptacle may be used, or multiple male pins and multiple female receptacles may be used.

Figure 2B:
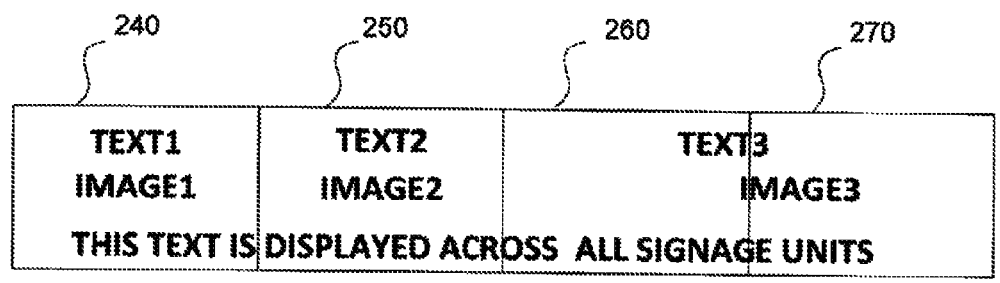
FIG. 2B is a diagram illustrating an example of interconnecting a plurality of MDS units, in accordance with some embodiments.

FIG. 2B is a diagram illustrating an example of interconnecting a plurality of MDS units, in accordance with some embodiments. In this example, a row of four MDS units 240, 250, 260 and 270 are lined up and interconnected to one another using their respective male pins 110, 115, interface connector 120, interface pin receptacles 210, 215 and connector receptacle 220. The combination of the interface pins, connector and their corresponding receptacles provide a pathway for data flow and electrical charging of the connected micro digital display units.

Since the display 105 of each of these MDS units 240, 250, 260 and 270 may be configured to operate in the border-less configuration, they together form an extended or a virtually continuous border-less display. As an example, the MDS units 240 and 250 may operate independently of all other MDS units by displaying the "text 1", "text 2", "image 1" and "image 2" information within their own displays. As another example, the MDS units 260 and 270 may operate together by displaying the "text 3" and "image 3" information across their display units. As another example, the MDS units 240, 250, 260 and 270 may operate together by displaying the "this text is displayed across all signage units" information across all of their display units. For some embodiments, an object displayed on the display of one MDS unit may be dragged and dropped into the display of a neighboring MDS unit. This may be convenient for an administrator to rearrange the information to be visible to the consumers. For some embodiments, the MDS unit may be placed in an admin mode to enable an administrator to perform content management activities using the touch-sensitive feature of the display 105. When appropriate, the MDS unit may be switched to a consumer mode. The setting of the appropriate modes may be performed by a system administrator using a server computer system (described in FIG. 7A).

Figure 3:
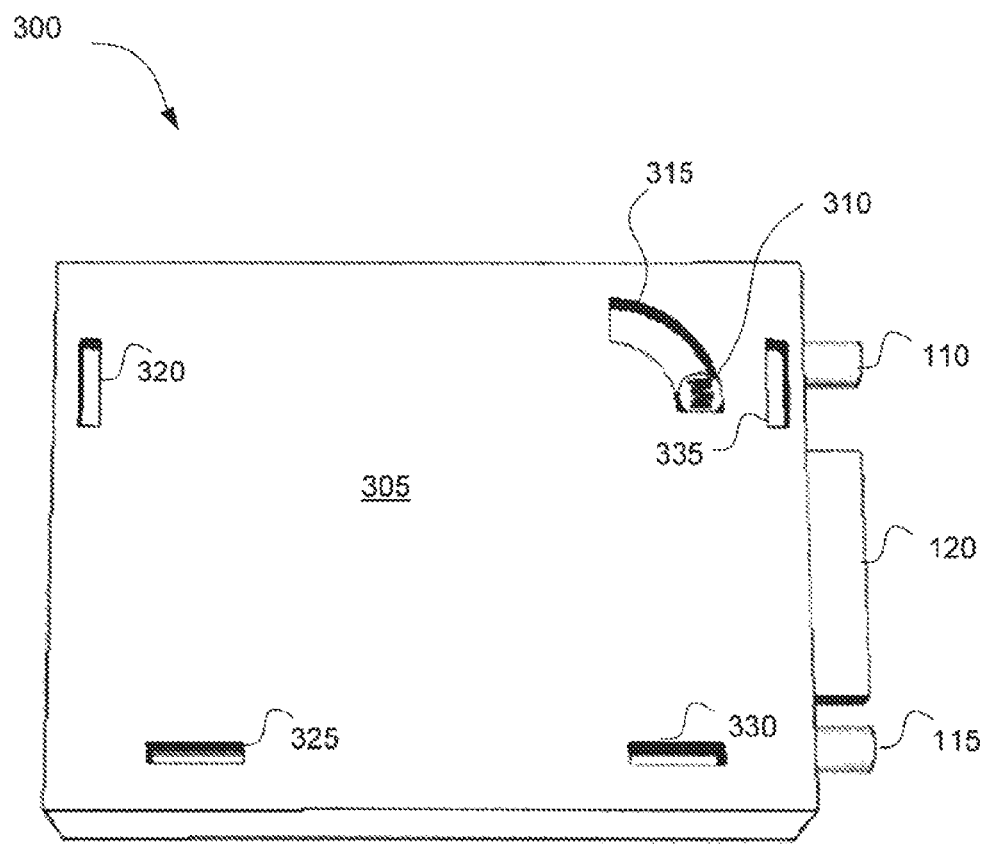
FIG. 3 is a diagram that illustrates a back view example of a MDS unit, in accordance with some embodiments.

FIG. 3 is a diagram that illustrates a back view example of a MDS unit, in accordance with some embodiments. Diagram 300 includes a MDS unit similar to the MDS unit illustrated in FIG. 1A. The back side 305 of the MDS unit may include multiple slots 320, 325, 330 and 335 configured to receive a retaining mechanism. For some embodiments, the slots 320 and 335 are generally vertical and positioned near the left and right side of the MDS unit. The slots 325 and 330 are generally horizontal and positioned near the bottom side of the MDS unit, as illustrated. For some embodiments, the back side 305 of the MDS unit may also include a mechanical engagement mechanism or activator 310 to engage or disengage the male pins 110, 115 and the interface connector 120. When the engagement mechanism 310 is in a first position (e.g., slide to a left most position), the male pins 110, 115 and the interface connector 120 are extended out from the body portion of the MDS unit. When the engagement mechanism 310 is in a second position (e.g., slide to a right most position), the male pins 110, 115 and the interface connector 120 are retracted into the body portion of the MDS unit.

The operation of the engagement mechanism 310 may help disconnecting or removing the MDS unit from its neighboring MDS unit for maintenance. Accordingly, the MDS unit may be referred to as being field replaceable. This capability allows removing a MDS unit from a middle of a row without disconnecting the entire row from one end to the other end. It may be noted that since each MDS unit is capable of operating independently, when one MDS unit is removed from a row, the remaining MDS units in the row may still be operable. When a row is interrupted because one MDS unit is removed, an emergency beacon may be generated and transmitted to a server computer system in a back office. Further, when a row is interrupted, the power to one or more of the MDS units may also be interrupted. In this situation, the backup battery power on these units may be used.

For some embodiments, the engagement mechanism 310 may be positioned within a slot 315 to enable the engagement mechanism 310 to be easily moved to its various positions. The slot 315 may also help keep the back side 305 of the MDS unit generally flush. It may be noted that even though the slot 315 in the current example has a shape of an arc, other shapes are possible. It may also be noted that the position of the slot 315 is only exemplary and other position may be possible.

Figure 4:
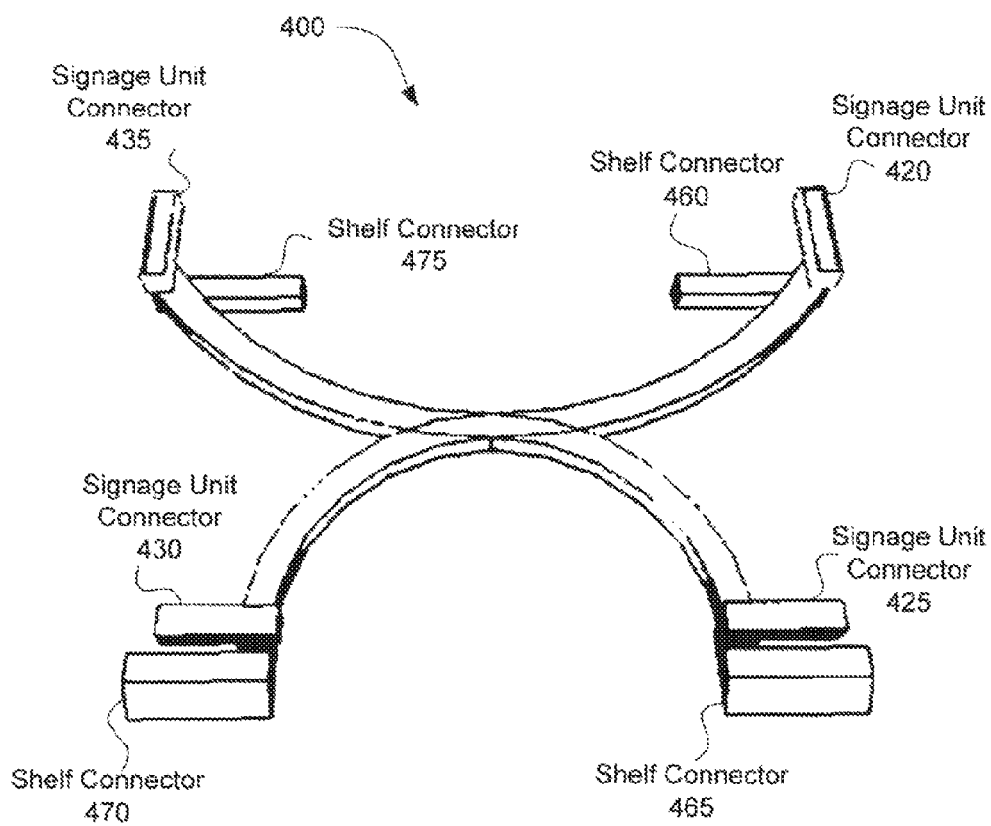
FIG. 4 is a diagram that illustrates a top view of an example retaining mechanism, in accordance with some embodiments.

FIG. 4 is a diagram that illustrates a top view of an example retaining mechanism, in accordance with some embodiments. The illustrated retaining mechanism 400 is a spring loading and locking mechanism that includes two connected arc-shape body portions connected to one another at an edge of the arc. Each of the arc-shape body portions may include two connectors for a shelf and two connectors for a MDS unit. Over all, the retaining mechanism 400 may include two sets of connectors. The first set of connectors is configured to attach the retaining mechanism 400 into a shelf edge. The second set of connectors is configured to attach the retaining mechanism 400 into the back side of the MDS unit. Referring the FIG. 4, the first set of connectors includes connectors 460, 465, 470 and 475, and the second set of connectors includes connectors 420, 425, 430 and 435. Each of the connectors in the first and second sets may have a spring force to enable holding the connectors in the MDS unit and in the shelf. For example, the spring force may enable adjusting one arc-shape body portions to be flexible enough to insert the connectors in the first set into openings associated with a shelf edge. Similarly, the spring force may enable adjusting the other arc-shape body portion to be flexible enough to insert the connectors in the second set into openings associated with a back side of the MDS unit.

Figure 5:
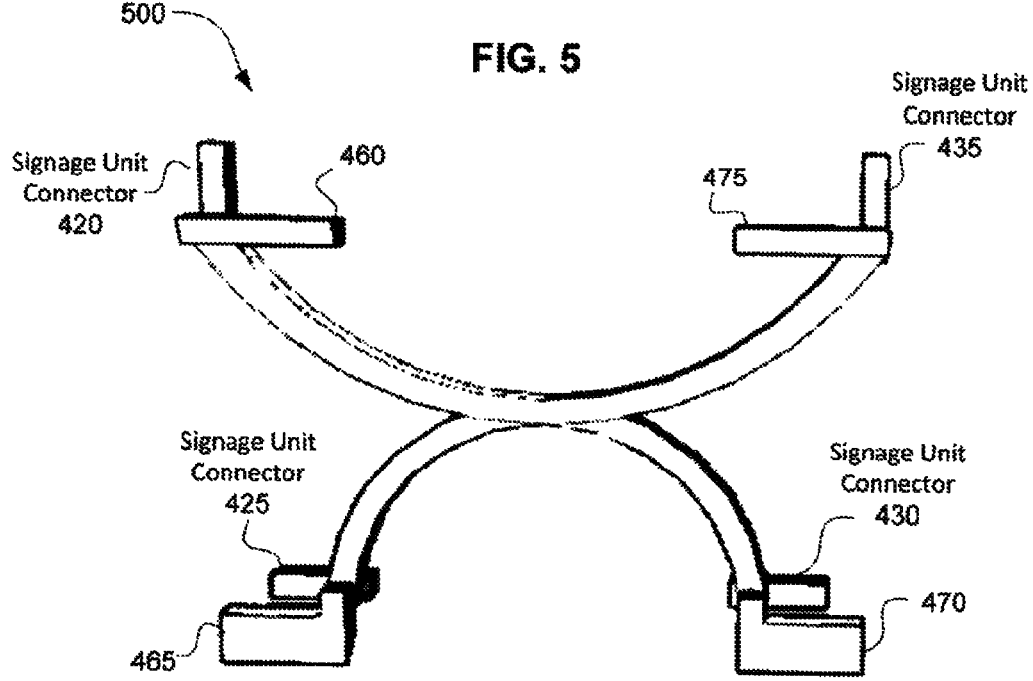
FIG. 5 is a diagram that illustrates a bottom view of an example retaining mechanism, in accordance with some embodiments.

FIG. 5 is a diagram that illustrates a bottom view of the example retaining mechanism, in accordance with some embodiments. It should be noted that the retaining mechanism illustrated FIGS. 4-5 is designed to keep the MDS unit in place at the edge of a shelf such that the display 105 of the MDS unit is visible to the consumer. The design of the retaining mechanism 400 may be dependent on the design of the edge of the shelf as well as the design of the back side of the MDS unit. As such, variations of the design of the shelf, the edge of the shelf and/or the back side of the MDS unit may necessitate appropriate modifications to the retaining mechanism 400. Regardless of the modification, the function of the retaining mechanism 400 may be to attach the MDS unit to the edge of the shelf while allowing the removal of the MDS unit from the edge of the shelf for maintenance, replacement, etc.

Figure 6:
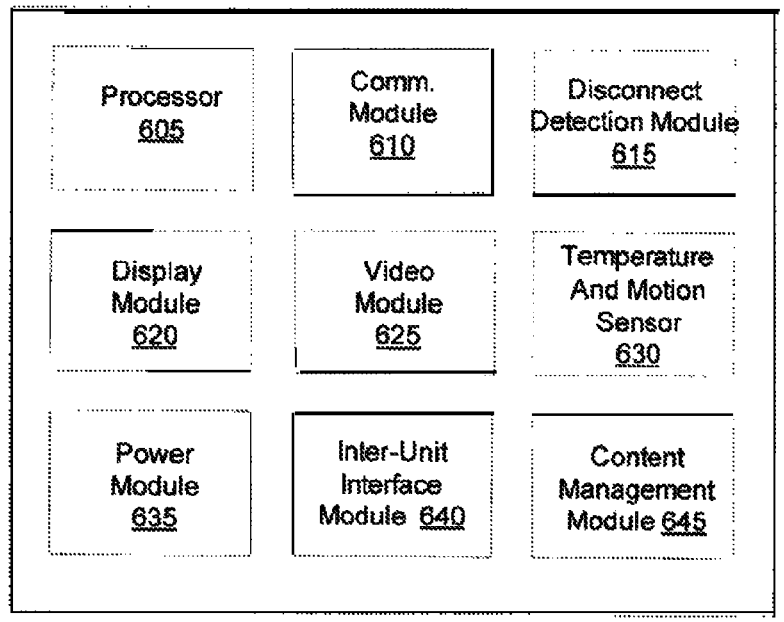
FIG. 6 is a diagram that illustrates example components in a MDS unit, in accordance with some embodiments.

FIG. 6 is a diagram that illustrates example components in a MDS unit, in accordance with some embodiments. An MDS unit 600 may include a processor 605, communication module 610, disconnection detection module 615, display module 620, camera module 625, temperature and motion sensor 630, power module 635, interface module 640, and content management module 645. Although not shown, other modules may also be included in the MDS unit 600 to enable it to perform the functions as described herein.

For some embodiments, the temperature and motion sensor 630 are configured to provide temperature and motion sensing capabilities. Although shown as one, there may be a separate temperature sensor and motion sensor. The camera module 625 is configured to enable collection of video analytics. The camera module 625 may also be configured to perform various other operations that take advantage of its capabilities. The MDS unit may also be configured to gather data from the shelf. The data collected by the temperature sensor 630 and the camera module 625 may be reported back to a server computer system (shown in FIG. 7A). The server computer system may also provide data (e.g., price, advertising, etc.) back to the MDS unit for display to the consumers 780 (shown in FIG. 7A). The communication module 610 may enable the MDS unit 600 to be connected to a network using WiFi (wireless fidelity, e.g., IEEE 802.11a-1999 or 802.11a, an amendment to the IEEE 802.11 specification that added a higher data rate of up to 54 Mbit/s using the 5 GHz band) or wired connection. The illustrated display module 620 is configured to enable the MDS unit to have a color display capability.

Power to the MDS unit may be provided and/or managed by the power module 635. The power may include the battery power and power provided by the store where the MDS unit 600 is located. For example, the power from the store may be provided at an end of an aisle where the shelves and the MDS unit 600 are located, and the power may be transmitted through rows of MDS units. The power may be normal power or low voltage power. The power may also be used to recharge the battery in the MDS unit. The interface module 640 may be configured to monitor and enable data to be transmitted to and received from the neighboring MDS units. The disconnect detection module 615 may be configured to monitor for any disconnection that may occur within a row of MDS units and to alert the server computer system of such disconnect. The content management module 645 may be configured to manage the display of the information provided by the server computer system on the display of the MDS unit. The MDS unit 600 may also include memory to store instructions and applications to enable the processor 605 to perform operations related to the various modules contained within the MDS unit 600.

Figure 7A:
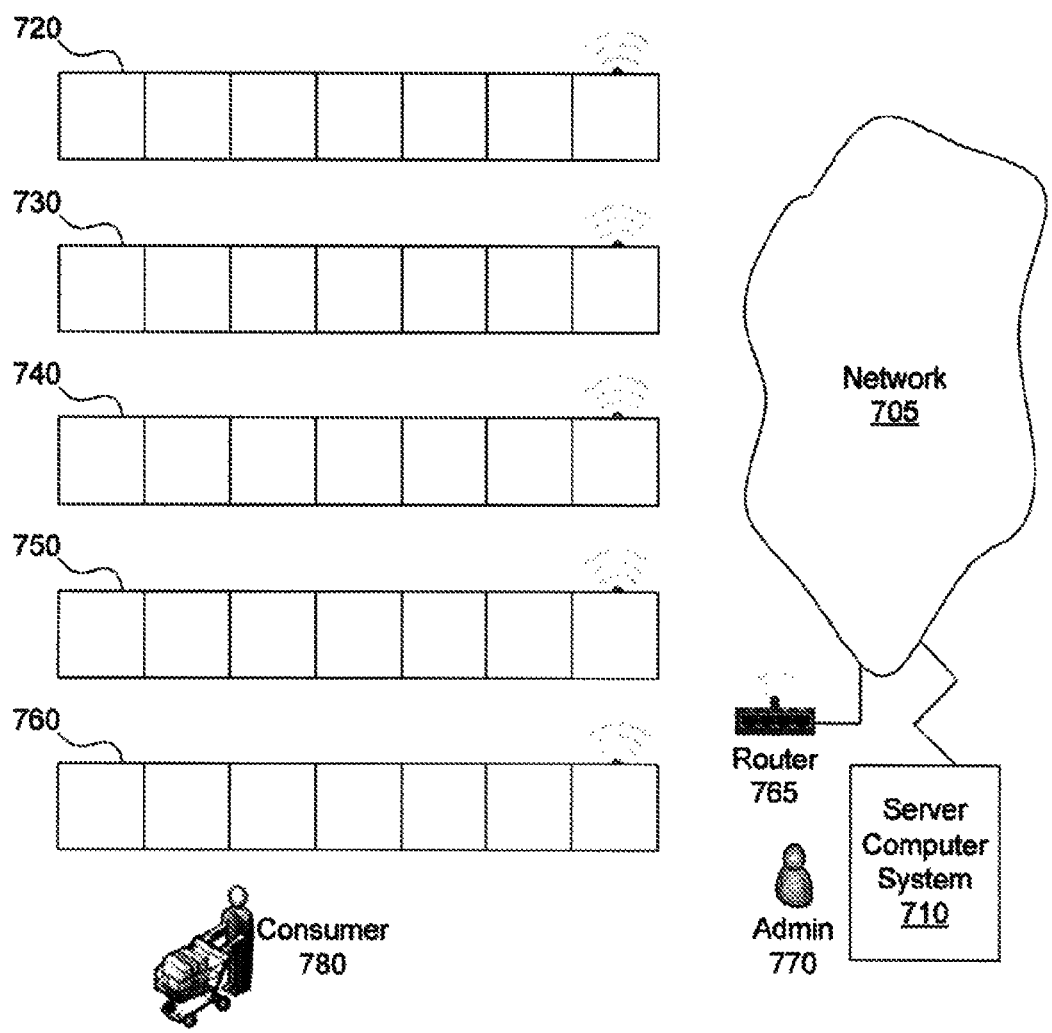
FIG. 7A is a network diagram that illustrates an example of components in a network that may be used to implement the MDS units, in accordance with some embodiments.

FIG. 7A is a network diagram that illustrates an example of components in a network that may be used to implement the MDS units, in accordance with some embodiments. Diagram 700 may include a network within a store where multiple rows 720-760 of MDS units are employed. For some embodiment, the MDS unit located on the furthest right may be configured to act as an access point to enable wireless communication to the network via router 665. As described above, each MDS unit includes a Wi-Fi capability. When disconnect occurs in a row of MDS units, the Wi-Fi in the MDS units remained in the row may be turned on.

The network 705 may include a local area network (LAN), a wide area network (WAN), 3G, 4G or a combination of these various types of communication protocols to enable the MDS unit to communicate with the server computer system and to any other network connected resources and/or services. For example, cloud-based resources and services may be available to enable the rich content related to the merchandises to be displayed on the display of the MDS unit within a store, within multiple stores belonging to a chain, within multiple stores located in a geographical area, and so on.

A server computer system 710 may be located, for example, in the back office of a store. The server computer system 710 may be connected to the network 705 to provide data communication and content distribution to all of the MDS units installed on the shelves. The server computer system 710 may be managed by an administrator or control agent 770. The administrator 770 may manage content that may be distributed to the MDS units for display to the consumers 780. The content may be specifically customized for each MDS unit when the MDS unit is to display information independently of the adjacent MDS units. Alternatively or in addition, the content may be specifically customized for a group of MDS units when the displays of these MDS units are used to display the merchandise-related information as one extended display.

The server computer system 710 may also be coupled with cloud-based resources and/or services accessible via the network 705. Some examples of the cloud-based resources and/or services include ratings, advertising content, licensing and meta-data for video analytics collection, etc.

Figure 7B:
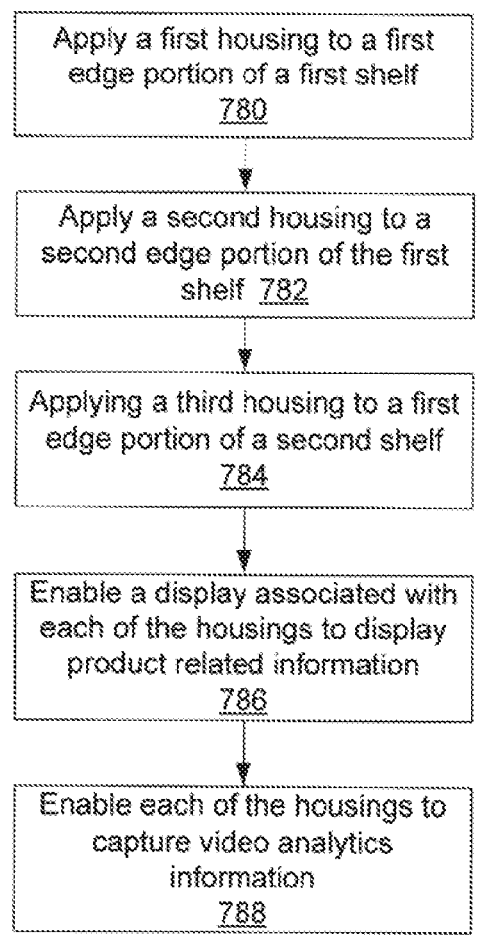
FIG. 7B is a flow diagram that illustrates an example of a method of enabling multiple displays to be used to display merchandise related information, in accordance with some embodiments.

Turning now to FIG. 7B, a method of enabling multiple displays to be used to display merchandise related information is shown. The method may correspond to the information described with FIGS. 1-7A. The method may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method may be written in any combination of one or more programming languages, including an object oriented programming language such as C++ or the like and conventional procedural programming languages, such as the "C" programming language or similar programming languages.

Block 780 provides for applying a first housing to a first edge portion of a first shelf. The first housing may include processor, a touch-sensitive display, a camera module, a motion and temperature sensor, etc. For example, the first housing may include modules similar to the modules described in FIG. 6. The first housing may be applied such that its display is to be visible to the consumer. Block 782 provides for applying a second housing to the second edge portion of the first shelf. The second housing is configured similarly to the first housing and is applied such that its display is to be visible to the consumer. The second edge portion of the first shelf and the first portion of the first shelf may be distant from one another or they may be adjacent one another.

Block 784 provides for applying a third housing to a first edge of a second shelf. The third housing is configured similarly to the first housing or the second housing and is applied such that its display is to be visible to the consumer. The first shelf and the second shelf may be in the same row, or they may be in different rows. The rows may be in a retail store where the merchandise related information is displayed to the consumers. The merchandise related information may be distributed from a server computer system. Block 786 provides for enabling the display associated with each of the housings to be able to display the merchandise related information. Each display may present different information related to different merchandises. However, when two displays are placed adjacent to one another, they may be used as one extended display. Block 788 provides for enabling each of the housings to capture video analytics information using its camera module.

Figure 8:
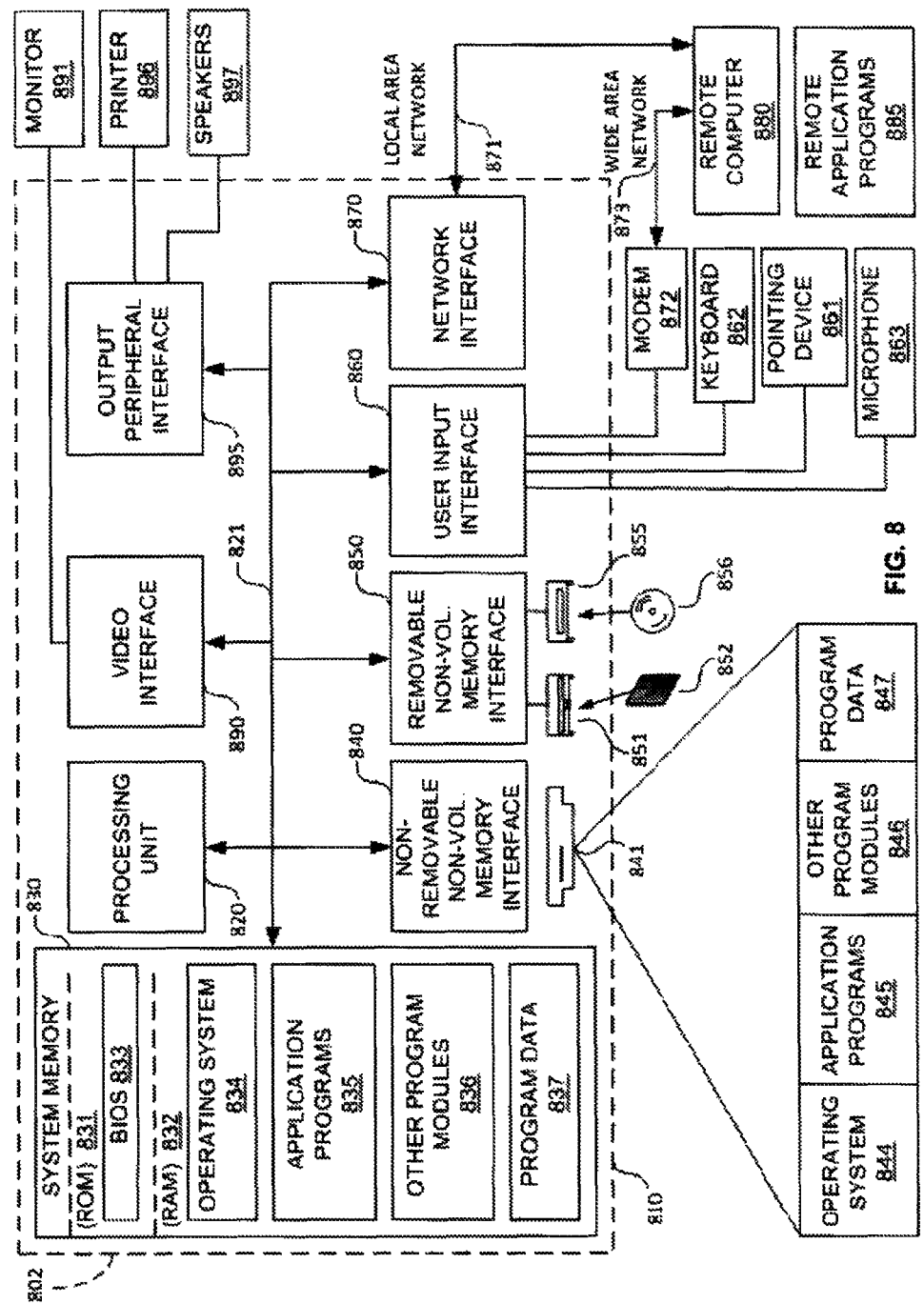
FIG. 8 is a diagram of an example computer stem that may be used with embodiments of the invention.

FIG. 8 is a diagram of an example computer system that may be used with embodiments of the invention. The computing system 802 is only one example of a suitable computing system, such as a mobile computing device, and is not intended to suggest any limitation as to the scope of use or functionality of the design. Neither should the computing system 802 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, minicomputers, mainframe computers, distributed computing environments that include any of the above systems or devices, and the like. For example, the computer system 802 may be implemented as a MDS unit or a server computer system.

Embodiments of the present invention may be described in the general context of computing device executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

Embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 8, the computer system 802 may include many of the components of the MDS described in FIG. 1A and FIG. 6. The computer system 802 may also include many components that may enable it to operate as a server computer system as described in FIG. 7A. The computer system 802 may include, but are not limited to, a processing unit 820 having one or more processing cores, a system memory 830, and a system bus 821 that couples various system components including the system memory 830 to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computer system 802 typically includes a variety of computer readable media. Computer readable media can be any available media that can be accessed by computer system 802 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer system 802. Communication media typically embodies computer readable instructions, data structures, or program modules.

The system memory 830 includes computer storage media in the form of volatile and/or nonvolatile memory such as read only memory (ROM) 831 and random access memory (RAM) 832. A basic input/output system (BIOS) 833, containing the basic routines that help to transfer information between elements within computer system 802, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer system 802 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer system 802. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. The operating system 844, the application programs 845, the other program modules 846, and the program data 847 are given different numeric identification here to illustrate that, at a minimum, they are different copies.

A user may enter commands and information into the computer system 802 through input devices such as a keyboard 862, a microphone 863, and a pointing device 861, such as a mouse, trackball or touch pad or touch screen. Other input devices (not shown) may include a joystick, game pad, scanner, or the like. These and other input devices are often connected to the processing unit 820 through a user input interface 860 that is coupled with the system bus 821, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 890.

The computer system 802 may operate in a networked environment using logical connections to one or more remote computers, such as a remote computer 880. The remote computer 880 may be a personal computer, a handheld device, a server, a router, a network PC, a peer device or other common network node, and typically includes many or all of the elements described above relative to the computer system 802. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer system 802 is connected to the LAN 871 through a network interface or adapter 870. When used in a WAN networking environment, the computer system 802 typically includes a modem 872 or other means for establishing communications over the WAN 873, such as the Internet. The modem 872, which may be internal or external, may be connected to the system bus 821 via the user-input interface 860, or other appropriate mechanism. In a networked environment, program modules depicted relative to the computer system 802, or portions thereof, may be stored in a remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should be noted that some embodiments of the present invention may be carried out on a computer system such as that described with respect to FIG. 8. However, some embodiments of the present invention may be carried out on a server, a computer devoted to message handling, handheld devices, or on a distributed system in which different portions of the present design may be carried out on different parts of the distributed computing system.

Another device that may be coupled with the system bus 821 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 872 may employ a Wireless Application Protocol (WAP) to establish a wireless communication channel. The communication module 872 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a tablet computer, Netbook, cell phone, a personal digital assistant, or other similar device with on board processing power and wireless communications ability that is powered by a Direct Current (DC) power source that supplies DC voltage to the mobile computing device and that is solely within the mobile computing device and needs to be recharged on a periodic basis, such as a fuel cell or a battery.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, specific examples are provided for shapes and materials; however, embodiments include those variations obvious to a person skilled in the art, such as changing a shape or combining materials together. Further, while some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. The embodiments of the invention are to be understood as not limited by the specific embodiments described herein, but only by scope of the appended claims.

What is claimed is:

1. An apparatus comprising:
   a processor;
   a display, in communication with the processor, and arranged on a first housing having a front side and a back side, the first housing configured to be coupled with an edge of a shelf, and wherein the display is configured to display information related to at least one merchandise to be placed on the shelf; and
   an attachment mechanism configured to enable the first housing to be attached to at least one adjacent housing such that the display of the first housing and a display of the adjacent housing are lined up to form a virtually continuous display, wherein the display of the first housing is configured to display the information related to the at least one merchandise using each of the following implementations:
   (a) independently of the display of the adjacent housing,
   (b) together with the display of the adjacent housing using the virtually continuous display, and
   (c) partially independently and partially together with the display of the adjacent housing.

2. The apparatus of claim 1, further including a retaining mechanism, wherein the first housing is to be coupled with the edge of the shelf using the retaining mechanism, and wherein the retaining mechanism includes a first set of connectors that connects to the shelf and a second set of connectors that connects to the back side of the first housing.

3. The apparatus of claim 2, wherein the back side of the first housing includes surfaces defining slots configured to receive the second set of connectors of the retaining mechanism.

4. The apparatus of claim 2, wherein the edge of the shelf is to be a front edge, and wherein the first housing is to be attached to the edge of the shelf in a manner that causes the display on the front side of the first housing to be visible to the consumer.

5. The apparatus of claim 1, wherein the at least one adjacent housing includes a second housing and a third housing, wherein the attachment mechanism includes a set of one or more male connectors and a set of one or more female connectors, wherein the set of one or more male connectors is configured to enable attaching the first housing to the second housing, and wherein the set of one or more female connectors is configured to enable the third housing to be attached to the first housing.

6. The apparatus of claim 5, further comprising an activator to engage or to retract the set of one or more male connectors.

7. The apparatus of claim 5, further comprising:
   a communication module coupled to the processor and configured to enable the first housing to be connected to a network using wireless communication; and
   an interface mechanism configured to enable the first housing to communicate with the second and the third housings, wherein the first housing is configured to receive information related to the at least one merchandise from a server computer system connected to the network to enable the information related to the at least one merchandise to be displayed on the display of the first housing.

8. The apparatus of claim 7, wherein the interface mechanism is configured to carry electrical power to power the first housing and to maintain a charge for a battery included in the first housing, the battery configured to enable the first housing to continue to operate if there is a loss of the electrical power.

9. The apparatus of claim 7, wherein based on the first housing being attached to the second and the third housings forming a row of attached housings, only the third housing in the row of housings is configured to be connected to the network using the wireless communication and to operate as a routing point to enable the first and the second housings in the row of attached housings to communicate with the server computer system.

10. The apparatus of claim 9, wherein the row of attached housings is to be located in a store having multiple separate rows of attached housings, and wherein a housing located at an end of each row of attached housings is to be designated as the housing that operates as the routing point.

11. The apparatus of claim 9, wherein a housing that is not configured to operate as the routing point is configured to communicate with the server computer system via its associated interface mechanism and the routing point.

12. The apparatus of claim 10, wherein the housing that is not configured to operate as the routing point is configured to monitor for disconnection of any of the attached housings in its associated row of attached housings and to transmit a disconnection notification to the server computer system using its own communication module based on detecting the disconnection.

13. The apparatus of claim 1, wherein the first housing includes a camera module configured to collect at least video analytics information, the housing further including a temperature sensor and a motion sensor.

14. The apparatus of claim 1, wherein the first housing is configured to have a height approximately a size of the edge of the shelf.

* * * * *